United States Patent [19]
Ray

[11] 3,915,150
[45] Oct. 28, 1975

[54] MORE LEAN METHOD OF STERILIZATION OF MALE ANIMALS

[75] Inventor: Earl E. Ray, Las Cruces, N. Mex.

[73] Assignee: Regents of New Mexico State University, Las Cruces, N. Mex.

[22] Filed: May 6, 1974

[21] Appl. No.: 467,290

[52] U.S. Cl. ................ 128/1; 128/326; 128/303 A; 128/306
[51] Int. Cl.² .......................................... A61B 17/12
[58] Field of Search .......... 128/303 R, 303.16, 306, 128/320, 379, 326, 1, 303 A, 158 R, 158 A

[56] References Cited
UNITED STATES PATENTS

| | | | |
|---|---|---|---|
| 2,125,404 | 8/1938 | Snyder | 128/306 |
| 2,619,964 | 12/1952 | Thaete | 128/303 R |
| 2,764,160 | 9/1956 | Alexander et al. | 128/303 A |
| 2,942,604 | 6/1960 | Grovlee | 128/326 X |
| 3,518,995 | 7/1970 | Claff | 128/379 |
| 3,547,124 | 12/1970 | Fergusson | 128/303 R |

Primary Examiner—Aldrich F. Medbery
Attorney, Agent, or Firm—Darden, Sage & Darden

[57] ABSTRACT

A method for the production of less fat, more lean meat, and heavier carcasses, and a more efficient utilization of feed for male ruminants and for sterilization of those male animals in which the scrotum is a mechanism needed in the production of viable semen wherein the testicles of the male animal, preferably not more than four months of age for ruminant animals, are moved up as close as possible to the abdominal wall and a ligature is placed around the animal's scrotum, below the testicles, with sufficient tightness that the testicles cannot drop downward.

21 Claims, 3 Drawing Figures

MORE LEAN METHOD OF STERILIZATION OF MALE ANIMALS

STATEMENT OF THE INVENTION

My invention relates to the art of sterilizing male animals in which the scrotum is a mechanism needed in the production of viable semen. It has specific application to all male animals which utilize the scrotum as a mechanism in the production of viable semen such as dogs and domesticated ruminants such as bulls, and rams, although it is equally applicable to all other male ruminants.

An object of my invention is to provide a simple, effective method of sterilization of all male animals in which the scrotum is a mechanism needed in the production of viable semen.

Another object of my invention is to provide a new and improved method of sterilization of ruminant male animals which will result in more meat, and heavier carcasses if the animal is sent to slaughter than other fertile or castrated male ruminants of the same class and age.

Other objects of my invention include providing a more efficient utilization of feed by the ruminant males, and providing a larger quantity of red meat to the consumer of ruminant animals at a reduced cost to the consumer.

Under the present art, sterilization of such animals involves several various methods, all of which result in the complete removal of the testicles and in most instances also most of the scrotum. The most common methods of such removal are by direct removal by use of a sharpened instrument or by placement of a ligature, usually a flexible ring or rubber band, around the scrotum dorsally above the testicles until the scrotum and testicles below the ligature drop off.

My invention considers the prior art and the above objects and all other objects which more fully hereinafter appear. In ruminant animals, and in many other male animals, the scrotum serves a necessary, regulatory function because the temperature of the testes is lower than that of the body. This function is accomplished by a muscular system that draws the testes close to the abdominal wall for warmth and lets them descend from the abdominal wall for cooling. This thermal regulatory mechanism of the scrotum is very important for normal sperm production. Bilateral cryptorchids, however, are completely sterile. Yet, the production of testosterone in bilateral cryptorchid by the interstitial cells does not decline. In many instances, in fact, it is enhanced.

The method utilized in my invention produces a "pseudocryptorchid" by duplicating the effects of natural bilateral cryptorchids. This duplication is accomplished by shortening the scrotum of such animal, for best results for ruminant animals, although not as a limitation, when that animal is not more than four months of age. Not only is the animal sterilized, but also the ruminant animal is in the optimum age range for the production of less fat, more lean meat, heavier carcasses and increase of efficiency of his feed utilization.

DETAILED DESCRIPTION OF THE DRAWINGS

Figure 1:
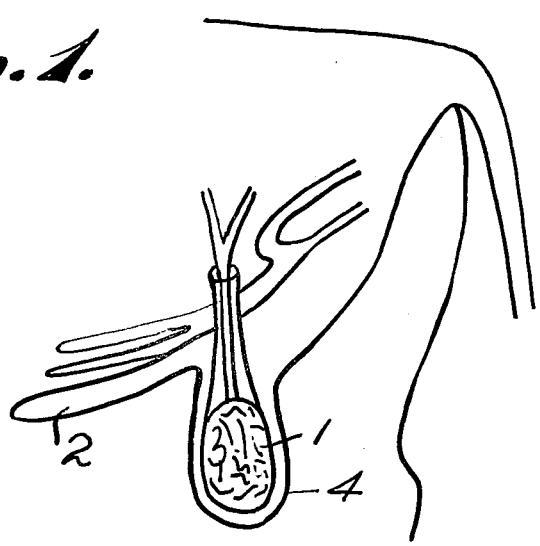
FIG. 1 is a diagrammatic view of the scrotum area of a fertile male ruminant animal.
Figure 2:
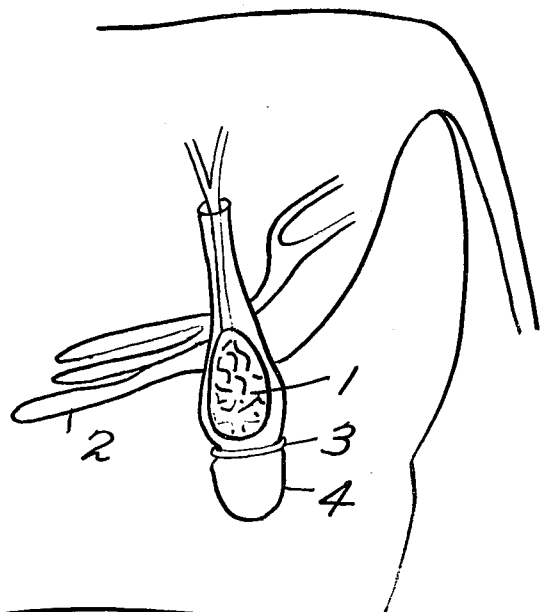
FIG. 2 is a diagrammatic view of an animal as shown in FIG. 1 after the testes are moved as close to the abdominal wall as possible and a ligature placed around the scrotum directly below the testes according to the method of the present invention.

My method requires that the testes 1 of a ruminant animal (FIG. 1) or other male animal utilizing the scrotum 4 as a mechanism for the production of viable semen be moved as near to the abdominal wall 2 as possible and a ligature (FIG. 2) 3 placed around the scrotum (FIG. 2) 4 directly below the testes. The ligature is placed sufficiently tight so that the testes will not drop downward thereafter. (FIG. 2) Usually the scrotum below the ligature will slough off after several weeks and the scrotum will heal (FIG. 3) 5, some ligatures will not cause the sloughing off of the lower scrotum and the ligature will be required to be maintained on the animal.

Shortening the scrotum requires considerably less time than castration for it can be done in 15 to 20 seconds. Another advantage over castration is that there is no loss of weight as experienced when castration is performed.

Figure 3:
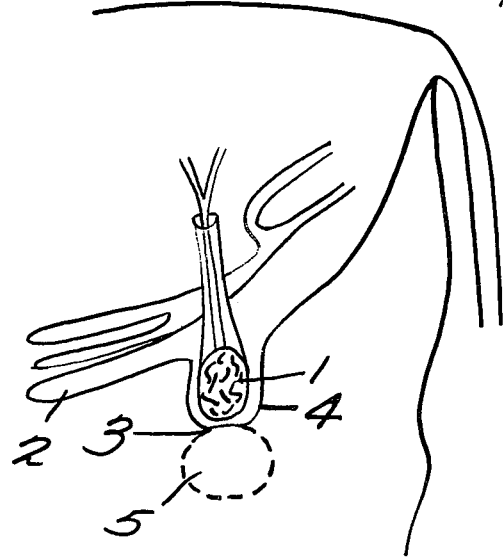
FIG. 3 is a diagrammatic view of an animal as shown in FIG. 2 after the ligature has been in place for several weeks.

As a result of the shortened scrotum, the testicles (FIG. 3) 2 lie in close proximity to the abdominal wall 2 (FIG. 3). The animal becomes sterile within a few days of the application of the ligature depending on the age of the animal when the ligature is applied. The testicles develop to about half the weight of the testicles of fertile males of the same age and weight. The testosterone level is retained and in many animals is increased. The weight of the testicles in a fertile bull (FIG. 1) are about 224 grams each; this weight compares with a weight of about 126 grams each in a bull that has been treated according to the teachings of the method of the present invention (FIG. 3).

As a specific example of my invention and as a preferred embodiment, not as a limitation, the testes of a male calf or lamb not more than four months of age are moved as closely to the abdominal wall as possible and a flexible band such as a rubber band is placed directly below the testes around the scrotum (FIG. 2) 3, sufficiently tight so that the testes will not drop downward. The scrotum below the rubber band normally sloughs off (FIG. 3) 5 after three or four weeks and the scrotum heals (FIG. 3). The lamb or calf is sterile shortly after the application of the band, the exact time depending on the age and breed of the animal.

My tests reflect that feed efficiency in costs of gain favor ruminant animals whose scrotum is shortened by my invention. The carcasses of these animals are heavier, there is more lean meat and there is less fat on the animals. As a further example of my invention, bulls sterilized using my method during the preferred range of not more than four months of age were heavier in tests than either fertile bulls or steers, had the largest ribeyes, the thinnest fat covering, the best yield grade, and the highest yield of edible meat. Further, the short scrotum bulls out-distance both fertile bulls and implanted steers in the quantity of production of red meat.

The animals so sterilized yielded in my tests an average of 40 pounds more edible meat than fertile bulls and an average of 52 pounds more edible meat than steers. At the current market price per pound of meat, there is more saleable meat from the carcasses of short scrotum bulls than from fertile bulls and steers.

Because of the efficient use of feed, the cattle and sheep feeding industry can save substantial feed per year at a cost saving to the owner or feed lot operator. Further, retailers can realize substantial extra meat.

In tests conducted at feedlots at New Mexico State University, Las Cruces, New Mexico, in 1973, the following results were observed:

Summary of Feedlot Data

| TRAIT | BULL | STEER* | SHORT-SCROTUM |
|---|---|---|---|
| Number of Animals | 20 | 54 | 61 |
| Initial Shrunk Weight (lbs.) | 478 | 428 | 440 |
| Final Shrunk Weight (lbs.) | 995 | 951 | 1,010 |
| Gain in Feedlot (lbs.) | 517 | 523 | 570 |
| Total Feed Consumption (lbs.) | 4,308 | 4,170 | 4,193 |
| Average Daily Gain (lbs., shrunk) | 2.35 | 2.40 | 2.65 |
| Dressing, % | 63.0 | 63.0 | 63.5 |
| Average Feed Consumption/Day (lbs.) | 19.31 | 18.06 | 18.47 |
| Pound Feed/Pound Gain (shrunk) | 7.9 | 7.8 | 7.1 |
| Cost Per Cwt. Pound Gain | $31.00 | $30.40 | $29.60 |

*Implanted with DES.

Summary of Carcass Data

| TRAIT | BULL | STEER | SHORT-SCROTUM |
|---|---|---|---|
| Number of Animals | 20 | 54 | 57 |
| Hot Carcass Weight (lbs.) | 629 | 599 | 641 |
| Chilled Carcass Weight (lbs.) | 613 | 585 | 625 |
| Marbling Score | Traces | Slight + | Slight + |
| Final Grade | Standard + | Good | Good − |
| Yield Grade | 2.97 | 3.18 | 2.62 |
| Fat Thickness 12th rib (inches) | .61 | .55 | .50 |
| Ribeye Area (sq. inches) | 11.9 | 11.1 | 12.7 |
| KHP, % | 2.0 | 2.8 | 2.4 |
| Carcass Conformation | P − | C | P − |
| Edible Meat (lbs.) | 459[1] | 447[2] | 499[3] |
| % Edible Meat | 75.7[1] | 75.1[2] | 79.4[3] |

[1] Based on 10 sides of beef.
[2] Based on 30 sides of beef.
[3] Based on 34 sides of beef.

It will be seen from the above results that short-scrotumed animals gained more weight in the same period of time than bulls and steers while consuming less grain per pound gained, and the carcasses had 4.3% more edible meat than steer carcasses, and 3.7% more edible meat than bull carcasses. It will thus be seen that the objects of the present invention have been achieved, and the advantageous results demonstrated.

I have illustrated and described my invention and several of its applications, but my protection is not to be limited to such details, as modifications, alternatives and equivalents will occur to those skilled in the art within the expected skill of their calling, all within the scope and spirit of the foregoing description and of the claims which follow:

1. A method for the sterilization of ruminant male animals comprising:
   a. Moving the testicles of the animal as close to the abdominal wall as possible, and
   b. Applying a restricting means directly below the testicles sufficiently tight so that the testicles cannot move downward.

2. The method of claim 1 wherein the ruminant animal is a bovine animal.

3. The method of claim 1 wherein the ruminant animal is an ovine animal.

4. The method of claim 1 comprising:
   c. Applying the restricting means when the ruminant animal is not more than four months of age.

5. The method for the reduction of fat on a ruminant male animal comprising:
   a. Moving the testicles of the animal as close to the abdominal wall as possible, and
   b. Applying a restricting means around the scrotum directly below the testicles sufficiently tight so that the testicles cannot move downward.

6. The method of claim 5 wherein the ruminant animal is a bovine animal.

7. The method of claim 5 wherein the ruminant animal is an ovine animal.

8. The method of claim 5 comprising:
   c. Applying the restricting means when the animal is not more than four months of age.

9. The method of producing more lean meat on a ruminant male animal, comprising:
   a. Moving the testicles of the animal as close to the abdominal wall as possible, and
   b. Applying a restricting means around the scrotum directly below the testicles sufficiently tight so that the testicles cannot move downward.

10. The method of claim 9 wherein the ruminant is a bovine animal.

11. The method of claim 9 wherein the ruminant is an ovine animal.

12. The method of claim 9 comprising:
    c. Applying the restricting means when the ruminant animal is not more than 4 months of age.

13. The method for the production of heavier carcasses in ruminant male animals comprising:
    a. Moving the testicles of the animal as close to the abdominal wall as possible, and
    b. Applying a restricting means around the scrotum directly below the testicles sufficiently tight so that the testicles cannot move downward.

14. The method of claim 13 wherein the ruminant animal is a bovine animal.

15. The method of claim 13 wherein the ruminant animal is an ovine animal.

16. The method of claim 13 comprising:
   c. Applying the restricting means when the ruminant animal is not more than 4 months of age.

17. The method of treating a ruminant male animal so that it has a more efficient utilization of feed, comprising
   a. moving the testicles of the animal as close to the abdominal wall as possible, and
   b. applying a restricting means around the scrotum directly below the testicles sufficiently tight so that the testicles cannot move downward.

18. The method of claim 17 wherein the ruminant animal is a bovine animal.

19. The method of claim 17 wherein the ruminant animal is an ovine animal.

20. The method of claim 17 comprising:
   c. Applying the restricting means when the ruminant animal is not more than four months of age.

21. The method for sterilization of those male animals in which the scrotum is a mechanism needed in the production of viable semen, comprising:
   a. Moving the testicles of the animal as close to the abdominal wall as possible, and
   b. Applying a restricting means around the scrotum directly below the testicles sufficiently tight so that the testicles cannot move downward.

* * * * *